(12) United States Patent
Sadek

(10) Patent No.: US 9,694,906 B1
(45) Date of Patent: Jul. 4, 2017

(54) VERTICAL TAKEOFF AND LANDING UNMANNED AERIAL VEHICLE

(71) Applicant: KING SAUD UNIVERSITY, Riyadh (SA)

(72) Inventor: Shereef Aly Sadek, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 10 days.

(21) Appl. No.: 15/132,107

(22) Filed: Apr. 18, 2016

(51) Int. Cl.
| | |
|---|---|
| *B64C 29/00* | (2006.01) |
| *B64C 39/08* | (2006.01) |
| *B64C 39/02* | (2006.01) |
| *B64C 25/10* | (2006.01) |
| *B64C 5/06* | (2006.01) |

(52) U.S. Cl.
CPC ........... *B64C 29/00* (2013.01); *B64C 5/06* (2013.01); *B64C 25/10* (2013.01); *B64C 39/024* (2013.01); *B64C 39/08* (2013.01); *B64C 2201/042* (2013.01); *B64C 2201/104* (2013.01); *B64C 2201/162* (2013.01)

(58) Field of Classification Search
CPC  B64C 29/00; B64C 39/08; B64C 5/06; B64C 25/10; B64C 39/024; B64C 2201/042; B64C 2201/162; B64C 2201/104
See application file for complete search history.

(56) References Cited

U.S. PATENT DOCUMENTS

| | | | | |
|---|---|---|---|---|
| 3,954,231 | A | * | 5/1976 | Fraser ............... B64C 3/16 244/225 |
| 5,419,514 | A | | 5/1995 | Ducan |
| D458,892 | S | * | 6/2002 | DeTore ............... D12/319 |
| D498,201 | S | * | 11/2004 | Moller ............... D12/319 |
| 7,188,802 | B2 | | 3/2007 | Magre |
| 7,410,122 | B2 | | 8/2008 | Robbins et al. |
| 7,735,774 | B2 | | 6/2010 | Lugg |
| 7,874,513 | B1 | * | 1/2011 | Smith ............... B64C 11/001 244/12.4 |
| 8,636,241 | B2 | * | 1/2014 | Lugg ............... B64C 29/0025 244/12.1 |

(Continued)

FOREIGN PATENT DOCUMENTS

JP        5-77789 A       3/1993

OTHER PUBLICATIONS wind-tunnel-models.com, Heinkel VJ 101 A6, Dec. 8, 2013.*

*Primary Examiner* — Valentina Xavier
(74) *Attorney, Agent, or Firm* — Richard C. Litman

(57) ABSTRACT

The vertical takeoff and landing unmanned aerial vehicle includes a pair of selectively rotatable ducted fans and a selectively rotatable thrust vectoring nozzle providing vertical takeoff and landing for an unmanned aerial vehicle or a similar type of aircraft. A pair of fixed forward-swept wings are mounted on a rear portion of a fuselage, and a pair of canards are mounted on a top end of a forward portion of the fuselage. The pair of ducted fans are respectively mounted on free ends of the pair of canards, and are selectively rotatable about an axis parallel to a pitch axis of the fuselage. An engine is mounted in the rear portion of the fuselage, and a thrust vectoring nozzle is mounted on the rear portion of the fuselage for directing thrust exhaust from the engine. The thrust vectoring nozzle is selectively rotatable about an axis parallel to the pitch axis.

7 Claims, 4 Drawing Sheets

(56) References Cited

U.S. PATENT DOCUMENTS

| | | | |
|---|---|---|---|
| 8,720,814 B2 | 5/2014 | Smith | |
| D736,140 S * | 8/2015 | Moller | D12/326 |
| D741,247 S | 10/2015 | Brody et al. | |
| 2007/0215748 A1* | 9/2007 | Robbins | B64C 39/068 244/12.5 |
| 2012/0234968 A1* | 9/2012 | Smith | B64C 29/0033 244/12.3 |
| 2013/0062455 A1* | 3/2013 | Lugg | B64C 29/0025 244/12.3 |
| 2016/0114887 A1* | 4/2016 | Zhou | B60F 5/02 348/148 |

* cited by examiner

VERTICAL TAKEOFF AND LANDING UNMANNED AERIAL VEHICLE

BACKGROUND OF THE INVENTION

1. Field of the Invention

The present invention relates to unmanned aerial vehicles (UAVs), and particularly to a vertical takeoff and landing UAV.

2. Description of the Related Art

A wide variety of aircraft designs for achieving vertical takeoff and landing (VTOL) exist. The addition of VTOL capability, however, typically decreases the overall efficiency of the aircraft, both through added weight as well as by making the aerodynamics of the aircraft less efficient. A typical VTOL aircraft is configured similar to a conventional aircraft, but with an added lift fan in most cases. The lift fan may be in communication with the aircraft engine or may be separately powered. The additional lift fan is commonly used in addition to tilting main propellers or jet nozzles such that the combination of the lift fan and the tilting main propellers or jet nozzles produces a vertical lifting force. Once the aircraft is hovering, the main rotors/nozzles are rotated to face horizontally and the lift fan is turned off, allowing the aircraft to fly in a normal horizontal mode.

Such an aircraft requires the addition of the lift fan and its associated components, which are solely used during takeoff and landing. During horizontal flight, the lift fan and its associated components are essentially dead weight. Further, if the lift fan and its associated components are not stored away in the fuselage, they tend to increase drag on the aircraft.

Another common configuration of VTOL aircraft uses multiple open rotors aligned vertically for take-off and landing, and while in hover mode, the rotors are turned in the horizontal direction (in a so-called "tiltrotor" craft) or tilted a few degrees for forward motion (in a "quadcopter" craft). However, tiltrotors can only takeoff and land vertically, since they use very large propellers whose diameters are larger than the ground clearance. Further, an aircraft with a very large propeller diameter cannot fly at high subsonic speeds due to formation of shock waves over the propeller's blades, which deteriorates its performance. Moreover, when a pair of tiltrotors are used, this configuration is susceptible to instabilities due to misalignment of the thrust vector with the aircraft's center of gravity.

Quadcopters, which are aircraft with four vertically mounted propellers and no fixed wings, rely on the propeller's thrust for vertical flight, as well as for forward motion. Quadcopters offer flexibility and maneuverability, but their lack of a fixed wing reduces their operational range and cruise speed, since a significant amount of their stored energy is spent in lifting the vehicle via thrust force instead of aerodynamic lift. Thus, a vertical takeoff and landing unmanned aerial vehicle solving the aforementioned problems is desired.

SUMMARY OF THE INVENTION

The vertical takeoff and landing unmanned aerial vehicle includes a pair of selectively rotatable ducted fans and a selectively rotatable thrust vectoring nozzle to provide vertical takeoff and landing. The vertical takeoff and landing unmanned aerial vehicle includes a fuselage having a top end, a bottom end, and opposed forward and rear portions. The fuselage is elongated along a roll axis thereof. A pair of fixed forward-swept wings are mounted on the rear portion of the fuselage, and a pair of canards are mounted on the top end of the forward portion of the fuselage. A V-shaped stabilizer is mounted on the top end of the rear portion of the fuselage.

The pair of ducted fans are respectively mounted on free ends of the pair of canards, and are selectively rotatable about an axis parallel to the pitch axis of the fuselage. An engine is mounted in the rear portion of the fuselage, and a thrust vectoring nozzle, which is in communication with the engine, is mounted on the rear portion of the fuselage for directing thrust exhaust from the engine. The thrust vectoring nozzle is selectively rotatable about an axis parallel to the pitch axis of the fuselage. An air intake duct is mounted on the top end of the rear portion of the fuselage for directing environmental air into the engine. Forward and rear retractable landing gear are preferably mounted on the respective bottom ends of the forward and rear portions of the fuselage.

In use, the pair of ducted fans and the thrust vectoring nozzle may be selectively rotated about the pitch axis of the fuselage to direct fan exhaust from the pair of ducted fans and the thrust exhaust from the engine downward along a yaw axis of the fuselage for vertical takeoff and landing. Similarly, the pair of ducted fans and the thrust vectoring nozzle may be selectively rotated about axes parallel to the pitch axis of the fuselage to direct the fan exhaust from the pair of ducted fans and the thrust exhaust from the engine rearward along the roll axis of the fuselage for horizontal flight.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
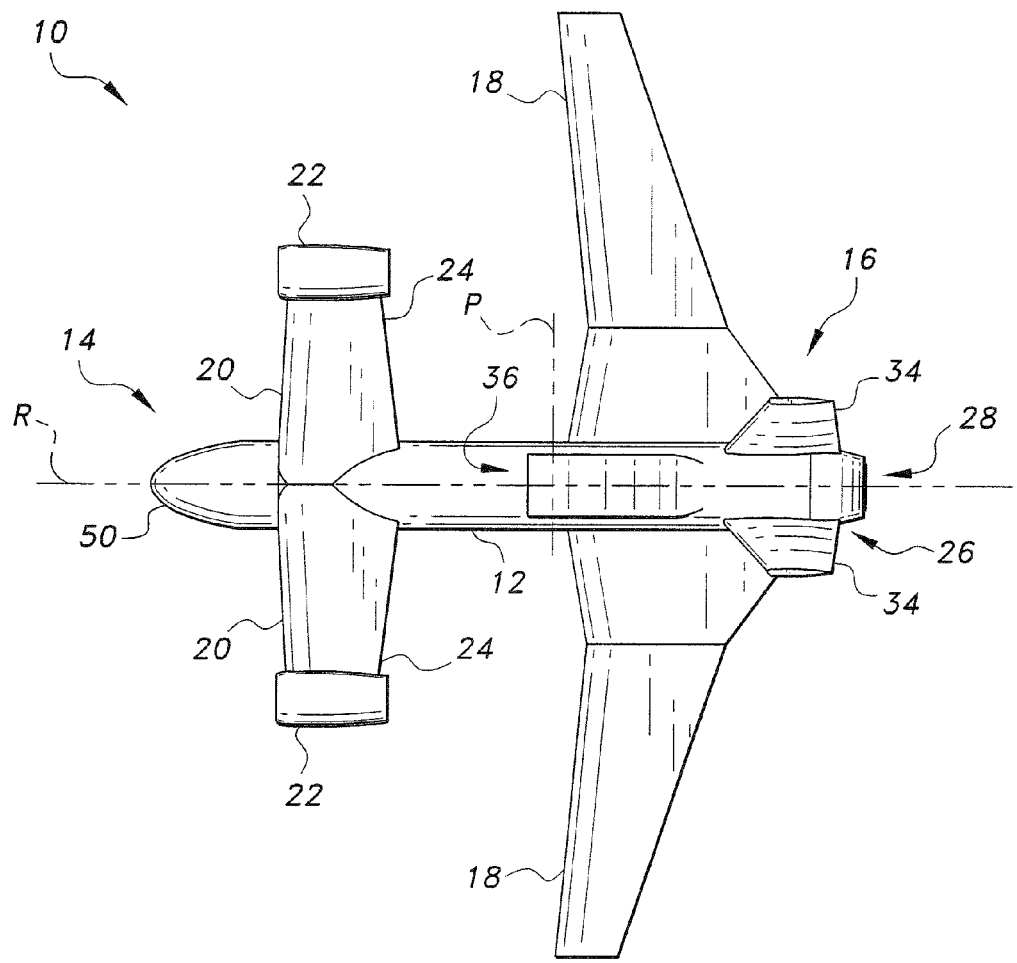
FIG. 1 is a top view of a vertical takeoff and landing unmanned aerial vehicle according to the present invention.

As shown in FIGS. 1-4, the vertical takeoff and landing (VTOL) unmanned aerial vehicle (UAV) 10 includes a pair of selectively rotatable ducted fans 22 and a selectively rotatable thrust vectoring nozzle 28 to provide vertical takeoff and landing for the unmanned aerial vehicle 10. The vertical takeoff and landing unmanned aerial vehicle 10 includes a fuselage 12 having a top end 30, a bottom end 32, and opposed forward and rear portions 14, 16, respectively. The fuselage 12 is elongated along a roll axis R thereof. A pair of fixed forward-swept wings 18 are mounted on the rear portion 16 of the fuselage 12, and a pair of canards 20 are mounted on the top end 30 of the forward portion 14 of fuselage 12. A V-shaped stabilizer 34 is further mounted on the top end 30 of the rear portion 16 of the fuselage 12, as is conventionally known.

Figure 4:
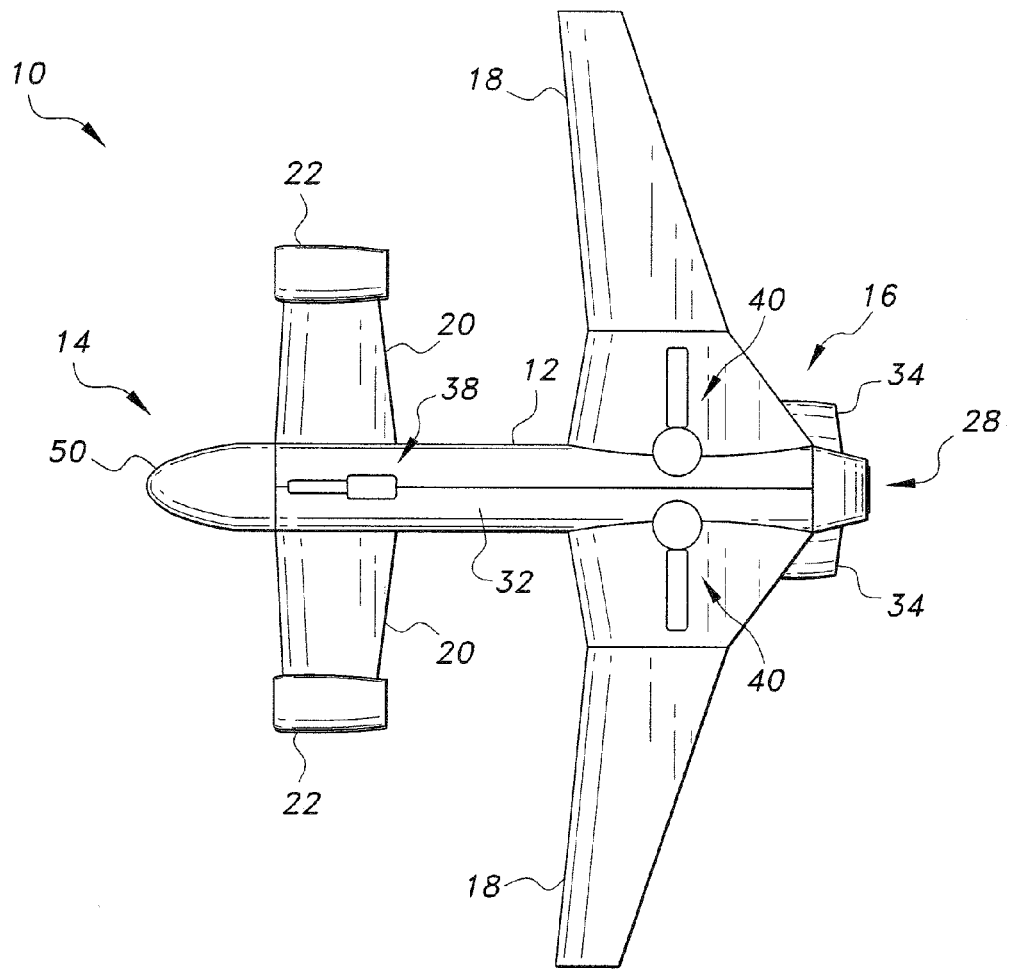
FIG. 4 is a bottom view of the vertical takeoff and landing unmanned aerial vehicle of FIG. 1.

The pair of ducted fans 22 are respectively mounted on free ends 24 of the pair of canards 20. The ducted fans 22 are selectively rotatable about an axis parallel to pitch axis P of the fuselage 12. An engine 26 is mounted in the rear portion 16 of the fuselage 12, and a thrust vectoring nozzle 28, which is in communication with the engine 26, is mounted on the rear portion 16 of the fuselage 12 for directing thrust exhaust from the engine 26. The thrust vectoring nozzle 28 is also selectively rotatable about an axis parallel to pitch axis P of fuselage 12. An air intake duct 36 is mounted on the top end 30 of the rear portion 16 of the fuselage 12 for directing air into the engine 26. Further, as shown in FIG. 4, forward and rear retractable landing gear 38, 40, respectively, are preferably mounted on the respective bottom ends 32 of the forward and rear portions 14, 16 of the fuselage 12.

Figure 3:
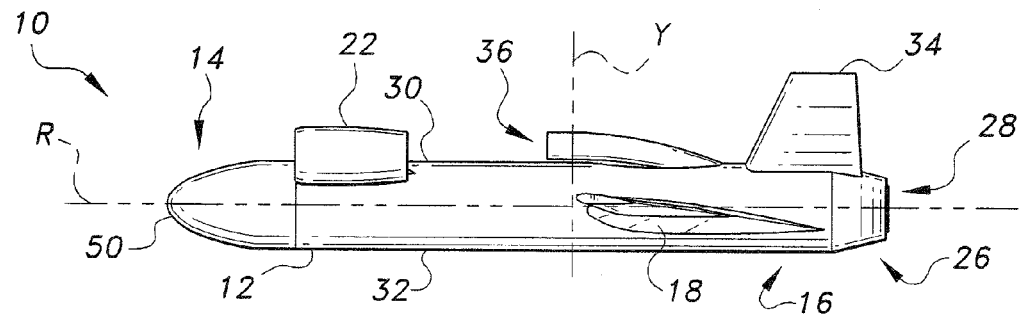
FIG. 3 is a side view of the vertical takeoff and landing unmanned aerial vehicle of FIG. 1.

The canards 20 primarily provide support for the pair of ducted fans 22, and are further used to balance the aerodynamic forces around the aircraft's center of gravity. It should be understood that the canards 20 may be either fixed or selectively rotatable with respect to fuselage 12. FIG. 3 best illustrates the distance between the canards 20 and the wings 18 with respect to the roll axis R. The space between the canards 20 and the wings 18 may be used for payload storage and/or for any other devices as may be required. Further, the positioning of the nose 50 ahead of canards 20 provides ample space for sensors, such as digital cameras, and/or flight control instruments, as may be required.

It should be further understood that the pair of fixed forward-swept wings 18 are similar to conventional aircraft wings, and include conventional components, such as control surfaces (i.e., ailerons and flaps) to control the aircraft motion while in level horizontal flight, as well as pitch-and-roll motion. The forward sweep of the wings 18 enables each wing 18 to be positioned further downstream along the fuselage 12, which makes room for conventional payload area and avionics. The V-shaped stabilizer 34 provides forces for pitch and yaw motion during level flight. Specifically, the two branches of the V-shaped stabilizer 34 produce pitch control if they are deflected symmetrically and provide yaw control if they are deflected anti-symmetrically.

Figure 2:
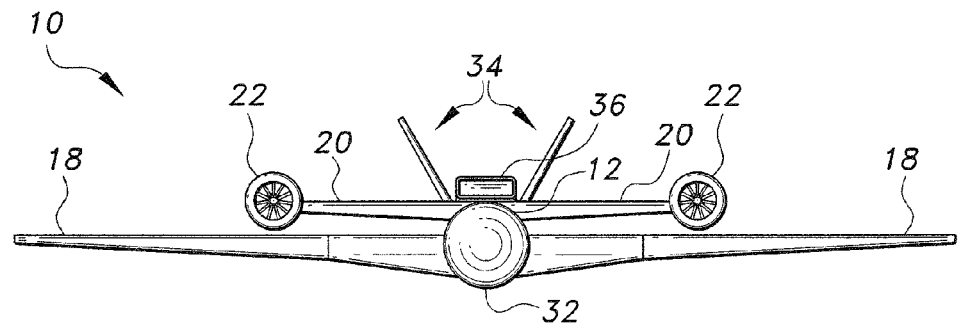
FIG. 2 is a front view of the vertical takeoff and landing unmanned aerial vehicle of FIG. 1.

As best shown in FIG. 2, the canards 20 are positioned vertically higher on the fuselage 12 than the wings 18. This ensures that the ducted fans 22 do not interfere with the wing flow in flight. However, it should be noted that the close proximity of the jet engine 26 to the ducted fans 22 will increase the dynamic pressure over a part of the wings 18, which may produce more lift force on the inner side of each wing 18. It should be further noted that the air intake duct 36 is mounted on the top end 30 of the fuselage 12. This allows the intake duct 36 to be positioned high enough that the boundary layer developed along the upstream portion of the fuselage 12 does not get ingested into the engine intake duct 36. It should be understood that the ducted fans 22 may be any suitable type of fans, such as ducted fans powered by electric motors, ducted fans powered by the main engine 26 (which can also be an electric motor) or the like.

Figure 5:
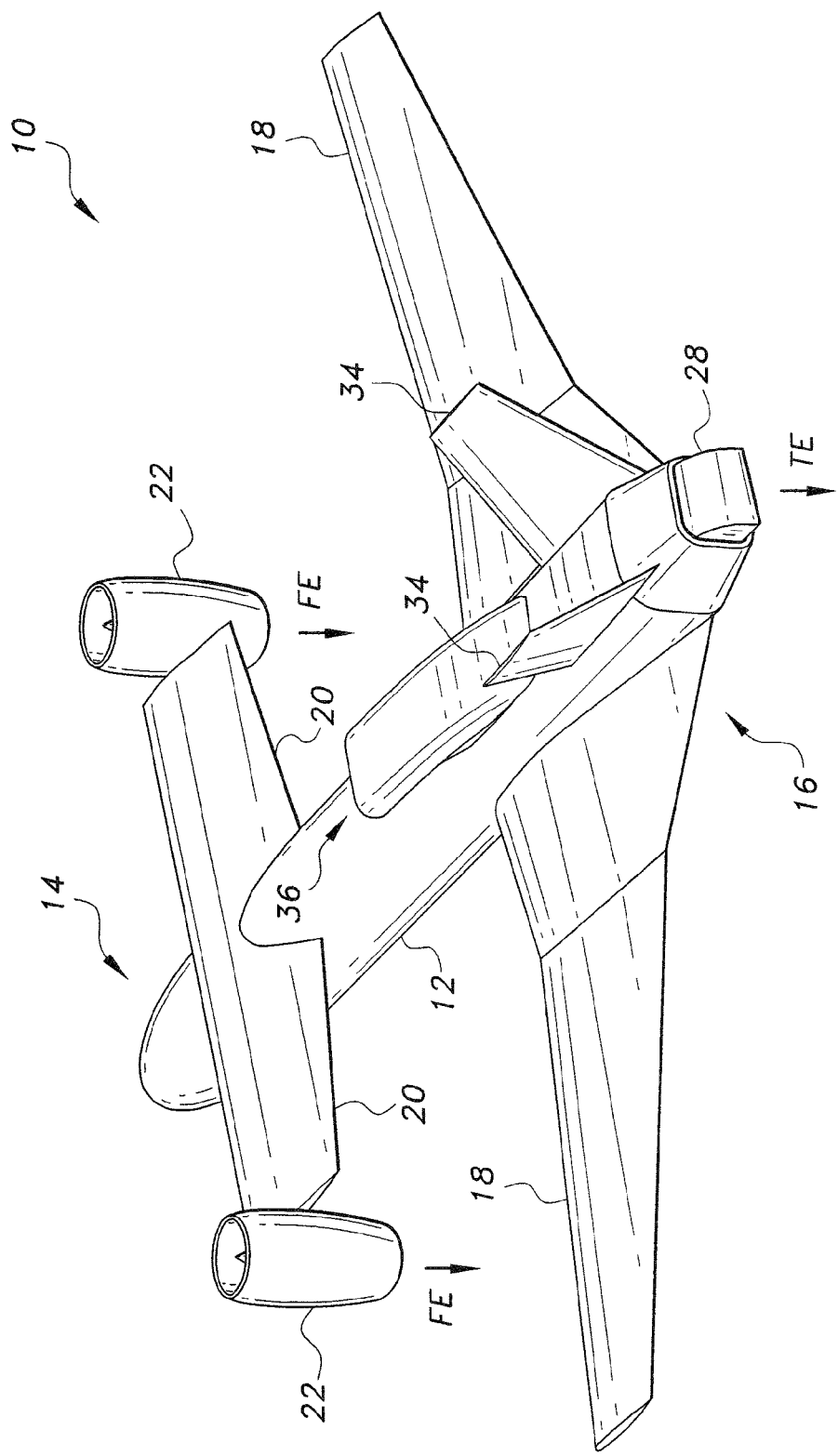
FIG. 5 is a perspective view of the vertical takeoff and landing unmanned aerial vehicle of FIG. 1, shown in a vertical takeoff and landing configuration.

In use, as shown in FIG. 5, the pair of ducted fans 22 and the thrust vectoring nozzle 28 may be selectively rotated about axes parallel to the pitch axis P of fuselage 12 to direct fan exhaust FE from the pair of ducted fans 22 and thrust exhaust TE from the engine 26 downward along a yaw axis Y of the fuselage 12 for vertical takeoff and landing. Similarly, as shown in FIGS. 1-4, the pair of ducted fans 22 and the thrust vectoring nozzle 28 may be selectively rotated about axes parallel to the pitch axis P of fuselage 12 to direct the fan exhaust FE from the pair of ducted fans 22 and the thrust exhaust TE from the engine 26 rearward along the roll axis R of the fuselage 12 for horizontal flight. In the configuration of FIGS. 1-4, the vertical takeoff and landing unmanned aerial vehicle 10 resembles and operates in a similar manner to a conventional takeoff and landing (CTOL) UAV.

In the configuration of FIGS. 1-4, the vertical takeoff and landing unmanned aerial vehicle 10 is controlled via conventional control surfaces (i.e., flaps, ailerons, elevators and rudders) for high lift, roll, pitch and yaw motions, respectively. As noted above, the aircraft in this configuration operates in a manner similar to a conventional fixed-wing CTOL aircraft. Thus, in this configuration, the aircraft has a relatively high lift-to-drag ratio (L/D), which is an important parameter in deciding the aircraft's range. The vertical takeoff and landing unmanned aerial vehicle 10 is estimated to have a lift-to-drag ratio of around 10-15. It should be noted that the vertical takeoff and landing unmanned aerial vehicle 10 uses the ducted fans 22 and the engine 26 during all phases of flight, which means that each source of thrust is sized to produce lift for only a fraction of the aircraft weight, and not the full weight.

The configuration of FIG. 5 shows the vertical takeoff and landing unmanned aerial vehicle 10 when the vehicle 10 is in vertical flight mode. In this configuration, the ducted fans 22 and the thrust vectoring nozzle 28 are rotated 90° about axes parallel to the pitch axis P such that the thrust vectors are pointing vertically upward. The resultant thrust force will be upward and pass through the aircraft's center of gravity. The thrust vectoring nozzle 28 produces more thrust than the ducted fans 22, depending on the stream-wise location of the center of gravity (typically a little closer to the ducted fans 22). While in vertical flight, the conventional control surfaces (ailerons, elevators, etc.) are not effective, and the aircraft 10 is controlled by thrust forces from the ducted fans 22 and the thrust vectoring nozzle 28. Pitch control is achieved by differentially varying the thrust from the ducted fans 22 and the thrust vectoring nozzle 28, as well as changing the tilt angle. Roll control is achieved by differential thrust from the ducted fans 22 (i.e., increasing the thrust from one fan and reducing the other). Yaw control may be achieved by using a three-dimensional thrust vectoring nozzle 28, where the nozzle 28 can move up and down as well as sideways. Alternatively, the aircraft 10 may be controlled by using fluidic jet control to divert the nozzle jet sideways, or by the use of flaps or vanes in the exhaust nozzle 28.

An aircraft, such as the vertical takeoff and landing unmanned aerial vehicle 10, has a total gross takeoff weight, $W_{TO}$, given as:

$$W_{TO} = W_{Payload} + W_{Prop} + W_{AV} + W_{Batt} + W_{Struct}, \quad (1)$$

where $W_{Payload}$ is the weight of the aircraft's payload, $W_{Prop}$ is the weight of the propulsion system, $W_{AV}$ is the weight of the avionics, $W_{Batt}$ is the battery weight (for an electric aircraft with an electric motor powered by onboard batteries, as discussed above), and $W_{Struct}$ is the weight of the airframe structure.

The payload, propulsion and avionics weights are known and fixed, while the rest are to be estimated. The airframe structure weight can be estimated as a fraction of the total take-off weight based on historical data. The required battery weight depends on the mission profile. Thus, equation (1) can be rewritten as:

$$W_{TO} = \frac{W_{Payload} + W_{Prop}W_{AV}}{1 - MF_{Batt} - MF_{Struct}}, \quad (2)$$

where $MF_{Batt}$ and $MF_{Struct}$ are the battery and structure weight mass fractions, respectively, i.e.:

$$MF_{Batt} = \frac{W_{Batt}}{W_{TO}} \text{ and } MF_{Struct} = \frac{W_{Struct}}{W_{TO}}.$$

The structure mass fraction for a fixed wing UAV is estimated to be $MF_{Struct}=0.45$. The size and number of batteries needed depends on the range and on the endurance requirements. The endurance can be estimated as:

$$\text{Endurance} = \frac{\text{Energy}_{Batt}}{P_{Batt}}, \quad (3)$$

where $\text{Energy}_{Batt}$ and $P_{Batt}$ are the energy content of the battery and the power drawn from the battery, respectively. The energy content of the battery can be further expressed as:

$$\text{Energy}_{Batt} = \text{Capacity} \cdot \text{Voltage} \cdot \eta_{Batt} \cdot f, \quad (4)$$

where the Capacity, Voltage, $\eta_{Batt}$ and f are the amount of charges in the battery (usually in Amp·hr), nominal battery pack voltage (in Volts), battery efficiency and battery depth of charge, respectively.

The depth of charge dictates how much of the battery charge can be withdrawn. For lithium polymer batteries this can be about 0.8. In order to size the batteries needed, it is more convenient to write the battery energy content in terms of specific energy $E_{spec}$, which is the amount of energy per unit mass of the battery. Thus, equation (4) can be rewritten as:

$$\text{Energy}_{Batt} = E_{spec} \cdot M_{Batt} \cdot \eta_{Batt} \cdot f, \quad (5)$$

or, in terms of battery weight, $$\text{Energy}_{Batt} = E_{spec} \cdot \frac{W_{Batt}}{g} \cdot \eta_{Batt} \cdot f. \quad (6)$$

Thus, to determine the amount of batteries needed using equation (3) the power drawn from the batteries must be estimated. During level flight, all forces acting on the aircraft are in equilibrium; i.e., the lift equals the weight and the thrust force equals the drag force. This can be expressed as:

$$L=W, \text{ and} \quad (7)$$

$$D=T, \quad (8)$$

where L, D, T, and W are the aircraft aerodynamic lift, drag, thrust and cruise weight, respectively. The propulsion system must provide enough power to balance the power due to drag force. The batteries are the source of power on board, thus:

$$P_{Batt} = P_{propulsion} + P_{other}, \quad (9)$$

where $P_{propulsion}$ and $P_{other}$ are the power required by the propulsion system and any other electric devices, respectively. For illustrative purposes, $P_{other}$ is neglected. The power required to overcome the aerodynamic drag is then given as:

$$P_{Drag} = T \cdot V = D \cdot V, \quad (10)$$

which simplifies to:

$$P_{Drag} = D \cdot V = D \cdot \frac{W_{TO}}{L} \cdot V = \frac{W_{TO}}{\frac{L}{D}} \cdot V. \quad (11)$$

Equation (11) estimates the required power to fly the aircraft at a constant speed. However, the input power to the propulsion system has to be higher than that due to inefficiencies in the propulsion system. This can be taken into account as:

$$P_{Propulsion} = \frac{P_{Drag}}{\Pi_i \eta_i}, \quad (12)$$

where $\eta_i$ are the efficiencies of different components in the propulsion system. This may be expanded as:

$$\Pi_i \eta_i = \eta_p \cdot \eta_g \cdot \eta_m \cdot \eta_{ESC} \cdot \eta_{Dist}, \quad (13)$$

where, $\eta_p$ is the propeller efficiency, $\eta_g$ is the gearbox efficiency, $\eta_m$ is the electric motor efficiency, $\eta_{ESC}$ is the electronic speed controller efficiency and $\eta_{Dist}$ is the power distributor efficiency, respectively. Substituting all of the above into equation (3) yields:

$$\text{Endurance} = \frac{E_{spec} \cdot W_{Batt} \cdot L \cdot f}{g \cdot W_{TO} \cdot D \cdot V} \cdot \Pi_i \eta_i \cdot \eta_{Batt}. \quad (14)$$

Equation (14) may be simplified using the following relationships:

$$L = q_\infty \cdot S \cdot C_L \quad (15)$$

$$D = q_\infty \cdot S \cdot C_D \quad (16)$$

$$\frac{L}{D} = C_L / C_D \quad (17)$$

$$q_\infty = \frac{1}{2} \rho_\infty V^2 \quad (18)$$

$$V = \sqrt{\frac{2 \cdot W_{TO}}{\rho_\infty \cdot S \cdot C_L}}, \quad (19)$$

where $C_L$, $C_D$, $\rho_\infty$ and S are the lift coefficient, drag coefficient, free stream density and aircraft wing's surface area, respectively. Substitution into equation (14) yields:

$$\text{Endurance} = \frac{E_{spec}}{g} \cdot \frac{W_{Batt}}{W_{TO}} \cdot \Pi_i \eta_i \cdot \eta_{Batt} \cdot f \cdot \frac{C_L^{\frac{3}{2}}}{C_D} \cdot \sqrt{\frac{\rho_\infty}{2} \cdot \frac{S}{W_{TO}}}. \quad (20)$$

However, the battery mass fraction is given by $MF_{Batt} = W_{Batt}/W_{TO}$, thus:

$$MF_{Batt} = \frac{\text{Endurance} \cdot g}{E_{spec} \cdot \Pi_i \eta_i \cdot \eta_{Batt} \cdot f} \cdot \frac{C_D}{C_L^{3/2}} \cdot \sqrt{\frac{2}{\rho_\infty} \cdot \frac{W_{TO}}{S}}. \quad (21)$$

A similar equation can be obtained for the battery mass fraction to fulfill the range requirement. If equation (21) is multiplied by the air speed and simplified in the same manner, then:

$$MF_{Batt} = \frac{R \cdot g}{E_{spec} \cdot \Pi_i \eta_i \cdot \eta_{Batt} \cdot f} \cdot \frac{C_D}{C_L}. \quad (22)$$

The above provides an estimate for the battery mass fraction to fulfill the endurance and range requirements which can be used with equation (2) to estimate the aircraft's takeoff weight. However, in order to do this, the aircraft's lift and drag coefficients must also be estimated, along with the wing-loading $W_{TO}/S$.

The aircraft's aerodynamic coefficients can be estimated using historical data as a first approximation. The maximum lift to drag ratio can be estimated as:

$$\left(\frac{C_L}{C_D}\right)_{max} = K_{LD}\sqrt{\frac{AR}{(S_{wet}/S)}}, \quad (23)$$

where $K_{LD}$ is a constant which depends on the type of aircraft, and AR and $S_{wet}$ are the aircraft's aspect ratio and wetted area, respectively. The Aspect Ratio is the ratio of the aircraft's wing span squared, $b^2$, divided by the wing's reference area, S, such that $AR=b^2/S$. The wetted area is the area of all surfaces that comes into contact with air. For a retractable landing gear propeller aircraft, $K_{LD}=11$ and the area ratio $S_{wet}/S \approx 5$. Thus, $C_L/C_D$ can be estimated as follows, assuming AR=6:

$$\left(\frac{C_L}{C_D}\right)_{max} = 11 \times \sqrt{\frac{6}{5}} \approx 12. \quad (24)$$

Once the aircraft main dimensions are determined, the drag polar can be estimated using the component buildup method. Calculation of the mass fractions and estimating the aircraft's take-off weight is performed by an estimate for the wing-loading $W_{TO}/S$, which is accomplished using a constraint analysis.

In this analysis, an equation is written for each performance requirement needed. The equations are written in terms of the aircraft's wing loading W/S and the power loading W/P, where P is the aircraft's required power. The two main requirements are the stall speed, $V_{stall}$, and the rate of climb, ROC. Since the ROC is specified during vertical takeoff, the thrust force must balance the aircraft's weight and drag:

$$\frac{P}{W} = ROC + \frac{D \cdot V}{W} = ROC\left(1 + \frac{D}{W}\right). \quad (25)$$

Since during vertical takeoff, the air is actually moving perpendicular to the aircraft's planform, the drag force is calculated differently as:

$$D_{VTO} = \frac{1}{2}\rho_\infty C_{D_{VTO}} \frac{S_{wet}}{2} ROC^2, \quad (26)$$

where $C_{D_{VTO}} \approx 1$. Thus:

$$D_{VTO} = \frac{1}{2}\rho_\infty ROC^2 \left(\frac{S_{wet}}{2S}\right) \cdot S. \quad (27)$$

Substituting this into equation (25) yields:

$$\frac{W}{P} = \left[ROC\left(1 + \frac{1}{2}\rho_\infty ROC^2 \left(\frac{S_{wet}}{2}\right)\frac{S}{W}\right)\right]^{-1} \quad (28)$$

$$V_{stall} = \sqrt{\frac{2 \cdot W}{\rho_\infty C_{L_{max}} S}}. \quad (29)$$

Figure 6:
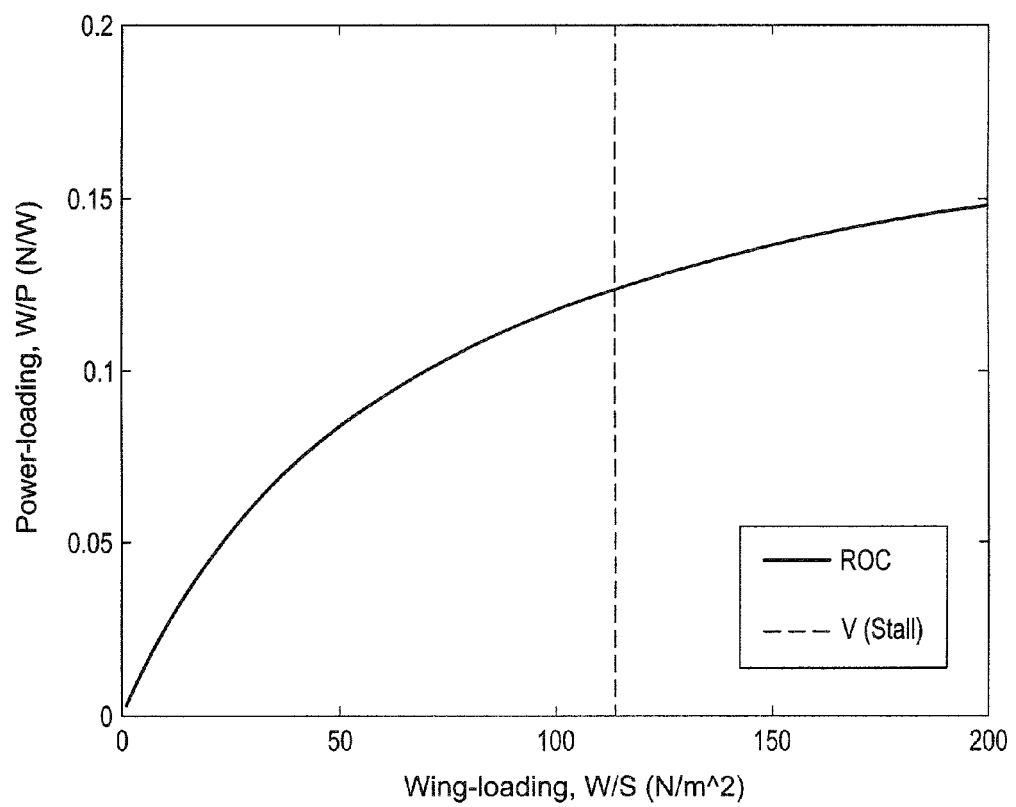
FIG. 6 is a graph showing power loading as a function of wing loading for the vertical takeoff and landing unmanned aerial vehicle of FIG. 1.

Other constraints can also be added, such as takeoff distance (for conventional takeoff), sustained turning radius, etc. Equations (28) and (29) are plotted for different values of wing-loading and the intersection point will provide a design that satisfies both requirements, as shown in FIG. 6. In FIG. 6, the area satisfying both requirements is the area below the ROC constraint curve and to the left of the $V_{stall}$ curve. Thus, the minimum power required for takeoff and the maximum wing loading is located at the intersection point of both curves. In other words, from FIG. 6, W/S≈114 and W/P≈0.124. Now that the wing loading is specified, the mass fractions can be calculated, along with the estimate of the aircraft's takeoff weight using equations (21) and (2), respectively. Next, the required wing area and motor power will be estimated using values of wing-loading and power loading, respectively. The inputs are as follows:

AR = 6; $W_{av}$ = 0.2g N; Endurance = 1 hr; $\eta_P$ = 0.82;

$\eta_{ESC}$ = 0.95; $C_{L_{max}}$ = 1.2; $\frac{S_{wet}}{S}$ = 5; $W_{prop}$ = 4.5g N;

Range = 60 km; $\eta_g$ = 1.0; $\eta_{Batt}$ = 0.6; $W_{payload}$ = 3g N;

$MF_{struct}$ = 0.45; $E_{spec}$ = 195 W·hr/kg; $\eta_m$ = 0.75;

and f=0.8. The results using these inputs are as follows: $MF_{Batt}$=0.29; $C_L$=0.60; S=2.31 m²; $W_{TO}$=287 N; $C_D$=0.041; b=3.72 m; $W_{Batt}$=82 N; $V_{cruise}$=18 m/s; and $\Pi_i \eta_i$=0.35.

Hover flight is a mode of flight where the aircraft is kept at a constant height using thrust forces in the vertical direction equal and opposite in direction to the aircraft's weight. The ideal power required for an aircraft to hover can be calculated using Actuator-Disc theory, which gives:

$$P = T \cdot V_1 = T\sqrt{(T/S_R)/2\rho}, \quad (30)$$

where, P, T, $S_R$, and $V_1$ are the power required, thrust force, rotor disc area, and the velocity at the propeller disc plane, respectively. Since during hover flight the thrust force is approximately equal to the aircraft's weight:

$$P \approx W\sqrt{(W/S_R)/2\rho}. \quad (31)$$

The ratio W/P is called the power loading and it is used as a measure of aircraft's efficiency during hover. The ideal hover power loading is expressed as:

$$\frac{W}{P} = \sqrt{\frac{2\rho}{(W/S_R)}}. \quad (32)$$

The ratio of ideal hover power to the actual power is called the hover efficiency, or figure of merit, M, such that:

$$M = \frac{P_{ideal}}{P_{actual}} = \frac{(W/P_{actual})}{(W/P_{ideal})}. \quad (33)$$

Typical values of M range between 0.6 and 0.8. To assess the hover efficiency of vertical takeoff and landing unmanned aerial vehicle 10, a motor is chosen to provide thrust in vertical flight. As an example, a 128 mm diameter electric ducted fan (EDF) motor, the DS-94-DIA HST (High Static Thrust) motor, manufactured by Schübeler of Germany, is selected. The maximum thrust force of this exemplary motor is about 105 N. Three such motors are required to provide the necessary thrust. Thus, each motor is required to produce T=W/3=96 N of thrust force. In order to take into account the duct losses when the motors are installed in the aircraft, the required thrust is taken as 100 N. For the exemplary motor, thrust force can be achieved at a motor voltage and current of about 50 V and 128 A, respectively. Thus, the total power required for all three motors is given by:

$$P = 3 \cdot V \cdot I = 3 \times 50 \times 128 = 19.2 \text{ kW}. \quad (34)$$

The actual hover power loading is given by W/P=2.51 lbf/Hp. It should be noted that British units are used since such is conventional when reporting the power loading. The ideal hover power loading can be calculated from equation (32) as:

$$S_R = 3 \times \pi D^2/4 = (3/4) \times \pi \times 0.128^2 \quad (35)$$

$$\frac{W}{P_{ideal}} = \sqrt{\frac{2 \times 1.112}{287/((3/4)\pi \times 0.128^2)}} = 2.9 \text{ lbf}/Hp. \quad (36)$$

Hence, the aircraft's hover efficiency is given by:

$$M = \frac{2.51}{2.90} = 0.86. \quad (37)$$

According to the above results, one can readily see that the hover efficiency of vertical takeoff and landing unmanned aerial vehicle 10 is relatively high when compared against conventional manned VTOL aircraft.

It is to be understood that the present invention is not limited to the embodiments described above, but encompasses any and all embodiments within the scope of the following claims.

I claim:

1. A vertical takeoff and landing unmanned aerial vehicle, comprising:
    a fuselage having a top end, a bottom end, and opposed forward and rear portions, the fuselage being elongated along a roll axis thereof;
    a pair of fixed forward-swept wings mounted on the rear portion of the fuselage;
    a pair of canards mounted on the top end of the forward portion of the fuselage, each canard extending from the forward portion, parallel to the pitch axis, and terminating with a free end;
    wherein the canards are positioned above the pair of fixed forward-swept wings with respect to the fuselage;
    a nose positioned forward of the pair of canards;
    a pair of ducted fans mounted on the free ends of the pair of canards, the ducted fans being selectively rotatable about an axis parallel to a pitch axis of the fuselage;
    an engine mounted in the rear portion of the fuselage; and
    a thrust vectoring nozzle mounted on the rear portion of the fuselage for directing thrust exhaust from the engine, the thrust vectoring nozzle being selectively rotatable about an axis parallel to the pitch axis of the fuselage,
    whereby the ducted fans and the thrust vectoring nozzle may be selectively rotated about an axis parallel to the pitch axis of the fuselage to direct fan exhaust from the ducted fans and the thrust exhaust from the engine downward along a yaw axis of the fuselage for vertical takeoff and landing, and the ducted fans and the thrust vectoring nozzle may be selectively rotated about the pitch axis of the fuselage to direct the fan exhaust from the ducted fans and the thrust exhaust from the engine rearward along the roll axis of the fuselage for horizontal flight.

2. The vertical takeoff and landing unmanned aerial vehicle as recited in claim 1, further comprising a V-shaped stabilizer mounted on the top end of the rear portion of the fuselage.

3. The vertical takeoff and landing unmanned aerial vehicle as recited in claim 2, further comprising an air intake duct mounted on the top end of the rear portion of the fuselage for directing air into the engine.

4. The vertical takeoff and landing unmanned aerial vehicle as recited in claim 1, further comprising forward and rear retractable landing gear mounted on the respective bottom ends of the forward and rear portions of the fuselage.

5. The vertical takeoff and landing unmanned aerial vehicle as recited in claim 1, wherein the pair of ducted fans are powered by the engine.

6. The vertical takeoff and landing unmanned aerial vehicle as recited in claim 5, wherein the engine comprises an electric motor.

7. The vertical takeoff and landing unmanned aerial vehicle as recited in claim 1, wherein the pair of ducted fans are powered by at least one electric motor.

* * * * *